R. H. RICE & W. JOHNSON.
THRUST BEARING.
APPLICATION FILED OCT. 20, 1911.

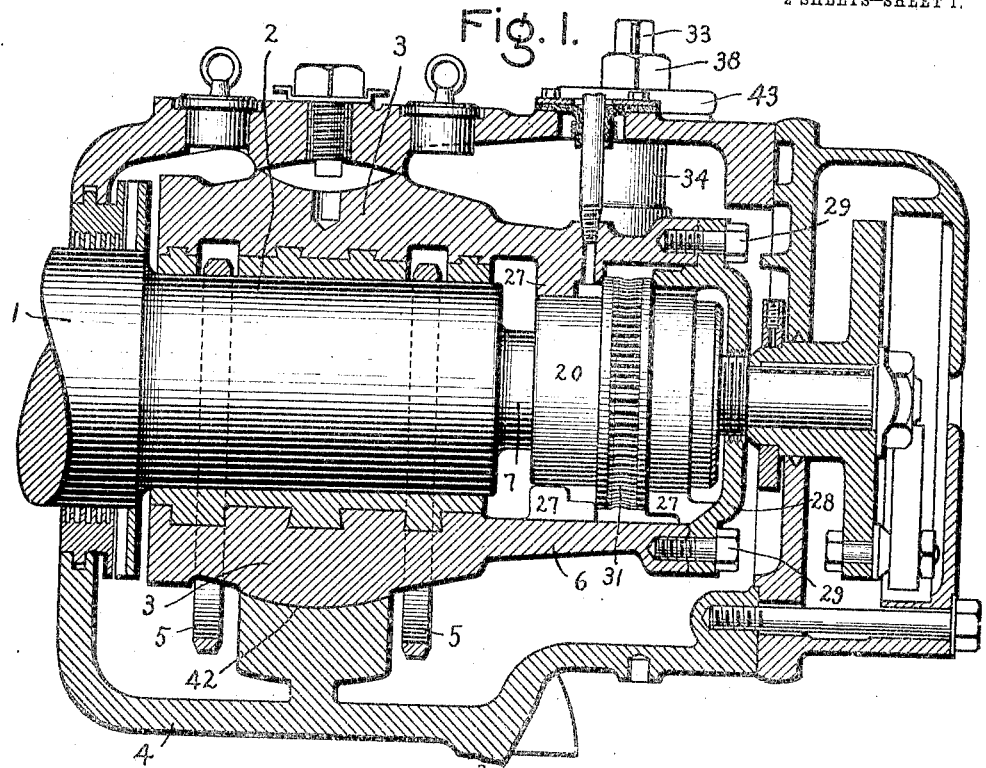
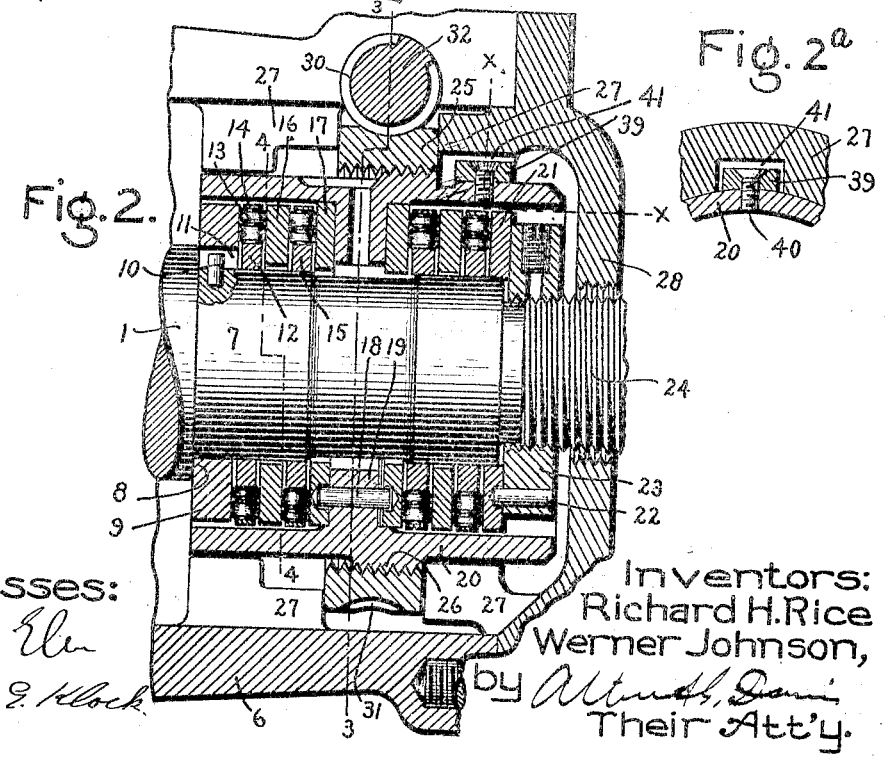

1,089,671.

Patented Mar. 10, 1914.
2 SHEETS—SHEET 2.

Witnesses:
J. Ellis Glen.
Earl G. Klock.

Inventors:
Richard H. Rice,
Werner Johnson,
by
Their Att'y.

UNITED STATES PATENT OFFICE.

RICHARD H. RICE AND WERNER JOHNSON, OF LYNN, MASSACHUSETTS, ASSIGNORS TO GENERAL ELECTRIC COMPANY, A CORPORATION OF NEW YORK.

THRUST-BEARING.

1,089,671. Specification of Letters Patent. Patented Mar. 10, 1914.

Application filed October 20, 1911. Serial No. 655,738.

*To all whom it may concern:*

Be it known that we, RICHARD H. RICE and WERNER JOHNSON, both citizens of the United States, residing at Lynn, in the county of Essex, State of Massachusetts, have invented certain new and useful Improvements in Thrust-Bearings, of which the following is a specification.

This invention relates to shaft bearings, and especially to those used on horizontal elastic fluid turbines to center the rotating member with respect to the stationary member, and to prevent said rotating member from accidentally shifting in either direction.

The object of the invention is to provide a thrust bearing of such construction that the shaft and the parts mounted thereon can be accurately adjusted to a given position, and retained there securely, in spite of the thrust caused by the impact of steam against the buckets on the turbine wheels. To obtain a proper clearance between the revolving buckets and the stationary ones, a fine adjustment is desirable. In the present invention this is secured by cutting external screw threads on the thrust casing containing the anti-friction thrust members, and providing a ring or collar having internal screw threads meshing with those on the casing. The ring is rotatable between stationary abutments, and can be turned by a worm meshing with worm gear teeth on the outer surface of the ring. Rotation of the ring causes the thrust bearing to slide longitudinally, carrying with it the shaft and the rotating member of the turbine.

Figure 3:
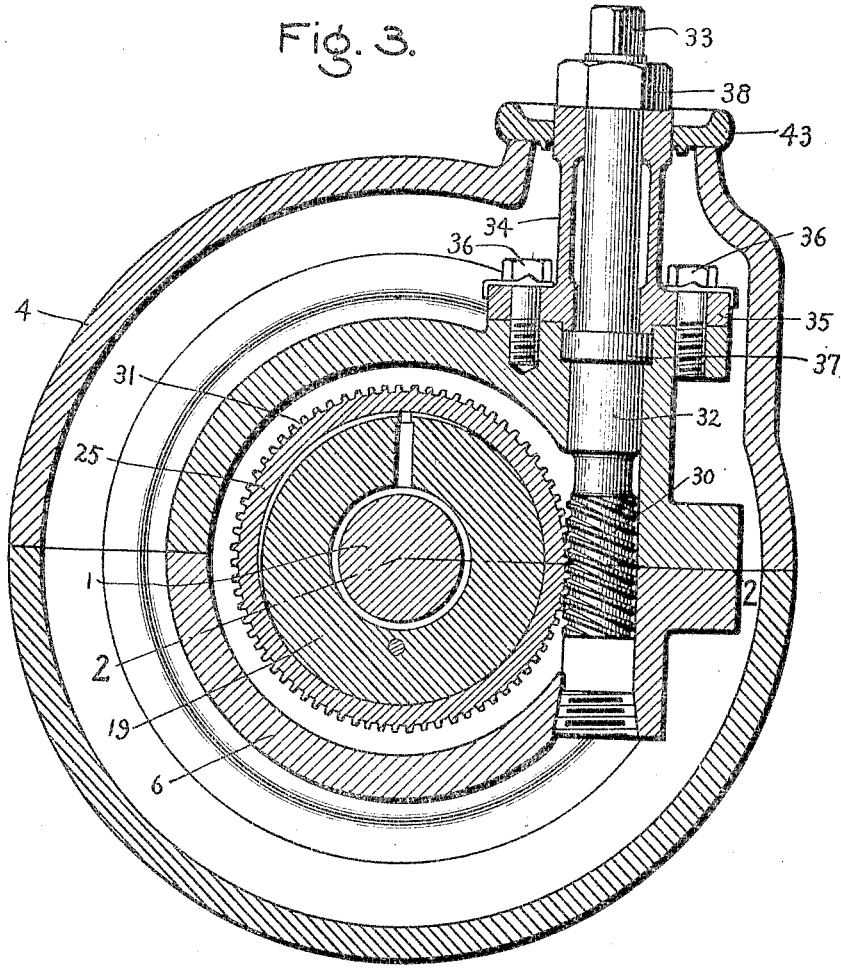
Figure 4:
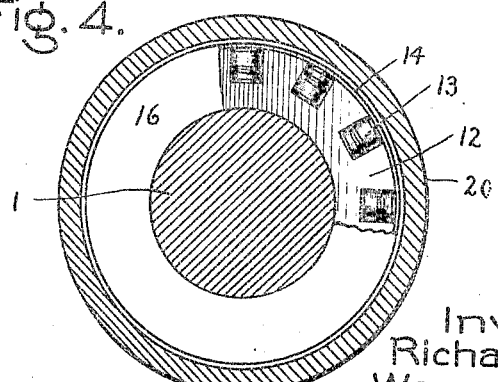

In the accompanying drawings, which represent one embodiment of our invention, Figure 1 is a longitudinal section showing the thrust bearing in elevation; Fig. 2 shows the thrust bearing in section on the line 2—2, Fig. 3; Fig. 2ª is a cross section on the line x—x, Fig. 2; Fig. 3 is a cross section on the line 3—3, Fig. 2; and Fig. 4 is a cross section on the line 4—4, Fig. 2, showing one of the anti-friction members.

The shaft 1 of the horizontal steam turbine has a journal 2 which is mounted in a self-alining bearing 3 in the journal box 4, and is provided with oiling rings 5. One end of the bearing is extended to form a housing 6 for the thrust bearing, which is applied to a portion 7 of the shaft, reduced in diameter to form a shoulder 8 against which the end ring 9 of the thrust bearing abuts. This ring is splined on the shaft by means of a stud 10 projecting from the shaft into a longitudinal groove 11 in said ring. Next to the end ring 9 is a loose annular carrier 12 having a plurality of radial recesses in each of which is a roller 13 arranged with its axis radial and confined by an encircling shroud 14. The rollers project slightly beyond the faces of the carrier. A second roller carrier 15 is separated from the first by a washer 16. On the other side of it is a stationary bearing ring 17, anchored by a dowel pin 18 to an internal annular rib 19 on the casing 20, which incloses the anti-friction thrust members above described. On the other side of this rib is a duplicate set of thrust members comprising roller carriers and washers and an end ring 21 secured by a dowel pin 22 to a nut 23 which is screwed upon the reduced threaded end 24 of the shaft. This nut enables all play between the thrust members to be taken up.

The casing 20 is capable of longitudinal movement with respect to the shaft, in order to effect a longitudinal adjustment of said shaft by a transmission of this movement through the rib 19 and the anti-friction thrust members to the shoulder 8 or the nut 23. The preferred mode of imparting movement to the casing is by means of a screw-threaded ring or nut 25 meshing with screw-threads 26 on the cylindrical exterior of the casing, and revoluble concentric with the casing. The ring is sustained against lateral displacement by lugs 27 in the housing 6 and on a cap 28 fastened by screws 29 to the end of said housing. For revolving the ring 25 we prefer to use a worm 30 meshing with worm gear teeth 31 on the exterior of said ring. The worm is cut on an arbor 32 which is journaled in the walls of the housing 6, and has a squared end 33 projecting out through an opening in the journal box. A sleeve 34 incloses the arbor above the housing, said sleeve having a flange 35 secured to said housing by screws 36. The lower end of the sleeve bears upon a collar 37 on the arbor, which is received in a countersink in the housing and acts as a thrust bearing for the arbor. A lock nut 38 on a screw-threaded portion of the arbor below the squared end 33 bears upon the upper end of the sleeve 34 and locks the arbor and the casing 20 after the latter has been adjusted. To prevent the casing from rotating with the ring 25 a key 39 is fastened to the casing by the screw 40 and engages with a longitudinal key way 41 in the inside of one of the lugs 27 on the cap 28.

The operation is as follows:—When it becomes necessary to adjust the shaft endwise, a wrench is applied to the lock nut 38 to loosen it, after which the arbor 32 can be rotated by using a wrench on the squared end 33. The turning of the worm 30 causes the ring 25 to revolve and the interaction of the screw-threads on said ring and on the casing 20 effects a longitudinal movement of said casing. The rib 19 in the casing presses the thrust members against either the shoulder 8 or the nut 23, as the case may be and thus imparts an axial movement to the shaft 1 and the rotor of the turbine. When the proper adjustment has been effected, the lock-nut 38 is tightened up to hold all the parts firmly in position. Any wear or lost motion in the thrust bearing can be taken up by means of the nut 23. The thrust of the shaft is sustained by the rib 19, being transmitted through one set or the other of rings, roller carriers and washers. The double set of rollers lessens the speed, distributes the wear and lengthens the term of service of the bearing. To permit free movement of the self-alining bearing in its spherical seat 42, the opening in the journal-box for the sleeve 34 is made large enough to let said sleeve move in any direction, and the annular space about it is closed by an annular cover 43 which rests loosely on the box and can slide to and fro with the movements of the bearing.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States is:—

1. The combination with a shaft having a shoulder and an adjustable abutment, of a casing surrounding said shaft and provided with an internal rib intermediate its ends, anti-friction elements between the opposite sides of the rib and said shoulder and abutment, a means that engages the periphery of the casing for adjusting it and with it the shaft axially, and a stationary element which carries said means.

2. The combination with a shaft having abutments, of a casing surrounding said shaft and provided with an internal rib, rings surrounding said shaft, annular carriers having radial rollers bearing against said rings, said rings and carriers being arranged between the rib and the abutments, means for adjusting the casing and with it the shaft axially, said means including a nut that is in threaded engagement with the periphery of the casing, and means which prevents the casing from turning and permits it to be adjusted axially.

3. The combination with a shaft having a shoulder, a nut screwed on a reduced portion of said shaft, an inclosing casing having an integral internal rib between said shoulder and nut, anti-friction members interposed between said shoulder and one side of said rib and between said nut and the other side of said rib, a housing for the casing, and means carried by the housing for adjusting the casing and with it the shaft axially.

4. The combination with a shaft having abutments, of a cylindrical casing surrounding said shaft and provided with an internal rib, anti-friction members between said rib and said abutments, external screw-threads on said casing, a screw threaded ring meshing therewith, means for rotating said ring to adjust the position of the shaft, means for preventing axial movement of the ring, and a key which prevents the casing from turning and permits it to be adjusted axially.

5. The combination with a shaft having abutments, of a cylindrical casing surrounding said shaft and provided with an internal rib, anti-friction members between said rib and said abutments, external screw-threads on said casing, a screw-threaded ring meshing therewith and provided with external worm gear teeth, a worm meshing with said teeth, means for preventing the movement of said ring along said shaft, and means for preventing said casing from rotating.

6. The combination with a shaft having a journal, and a reduced portion having abutments, of a bearing for said journal having an extension forming a housing for said reduced portion, a casing in said housing surrounding said reduced shaft portion, thrust members between said casing and said abutments, one of the abutments being adjustable to take up wear and lost motion of the thrust bearing, means carried by the housing for causing a longitudinal adjustment of the casing, said means comprising a nut that engages the casing, a device for turning the nut, lugs carried by the housing which engage opposite sides of the nut to prevent axial movement thereof, and a key for the casing that is carried by the housing.

7. The combination with a shaft having a journal and a reduced portion provided with abutments, of a self-alining bearing for the journal having an extension inclosing the reduced portion of the shaft, a casing surrounding the reduced portion, said casing being housed in the extension and provided with an external screw thread, thrust members between the casing and the abutments, a ring or nut mounted in the extension and engaging the thread on said casing, an arbor journaled in the extension, and a worm on the arbor for turning the ring.

8. The combination of a shaft having a journal, a bearing for the journal that is provided with a housing arranged beyond said journal, a thrust bearing carried by the housing, a journal box in which the bearing is mounted, and means carried by the housing for moving the thrust bearing and the shaft axially, said means comprising a nut that engages the bearing and is rotatably mounted in the housing, and a device for turning the nut that is mounted in said housing.

9. The combination of a shaft having a journal, a bearing for the journal that is provided with a housing, a thrust bearing for the shaft located within the housing and including an outer member having an external screw thread, means for adjusting the thrust bearing to take up wear and lost motion, a threaded ring that is anchored against axial movement in the housing and engages the thread on the thrust bearing member, and means carried by the housing for turning the ring to move the thrust bearing and the shaft axially.

10. The combination of a shaft having a journal, a bearing provided with a housing, a thrust bearing for the shaft, a casing arranged in the housing, said casing having an internal projection that coöperates with the thrust bearing and an external screw thread, a ring coöperating with the screw thread, a journal box, means for anchoring the ring against axial movement, which are carried by the first bearing, and means carried by said bearing for rotating the ring to move the thrust bearing and shaft axially.

11. The combination with a shaft having a journal and a bearing therefor, a journal box in which the bearing is mounted, a thrust bearing that engages the shaft and prevents independent axial movement thereof, means for adjusting the bearing to take up wear and lost motion, a screw threaded ring that surrounds the thrust bearing and is anchored against axial movement by the first bearing, and a worm and arbor carried by said bearing for turning the ring to move the shaft axially.

12. The combination of a shaft, a bearing therefor, a journal box that supports the bearing, a thrust bearing that engages the shaft and comprises alternated rings and rollers, a casing to which the thrust of the bearing is transmitted, a spline to hold the casing against rotation, a ring that is threaded to the periphery of the casing and is anchored in the first bearing against axial movement, and a means for rotating the ring to adjust the thrust bearing and shaft axially.

13. The combination of a shaft, a thrust bearing for the shaft, a casing for the bearing to which the thrust is transmitted, a housing in which the casing is located, a device arranged between the housing and the casing for holding the casing against rotation, a ring or nut that is threaded to the periphery of the middle portion of the casing and held against axial movement in the housing, and means for turning the ring to adjust the casing and the shaft axially.

14. The combination with a shaft having a journal and abutments, a bearing for the journal, a journal box in which the bearing is mounted, a casing surrounding the shaft and provided with an internal rib, antifriction elements between the abutments and rib, a housing for the bearing, an adjusting means on the periphery of the casing, and a device carried by the housing that coöperates with the adjusting means to move it and projects through a side wall of the journal box.

In witness whereof, we have hereunto set our hands this seventeenth day of October, 1911.

RICHARD H. RICE.
WERNER JOHNSON.

Witnesses:
JOHN A. McMANUS, Jr.,
FRANK G. HATTIE.